July 2, 1940.  M. B. FRANK  2,206,179
APPARATUS FOR AUTOMATICALLY SPRAYING LUMBER WITH PRESERVATIVE FLUID
Filed Sept. 12, 1938    4 Sheets-Sheet 3
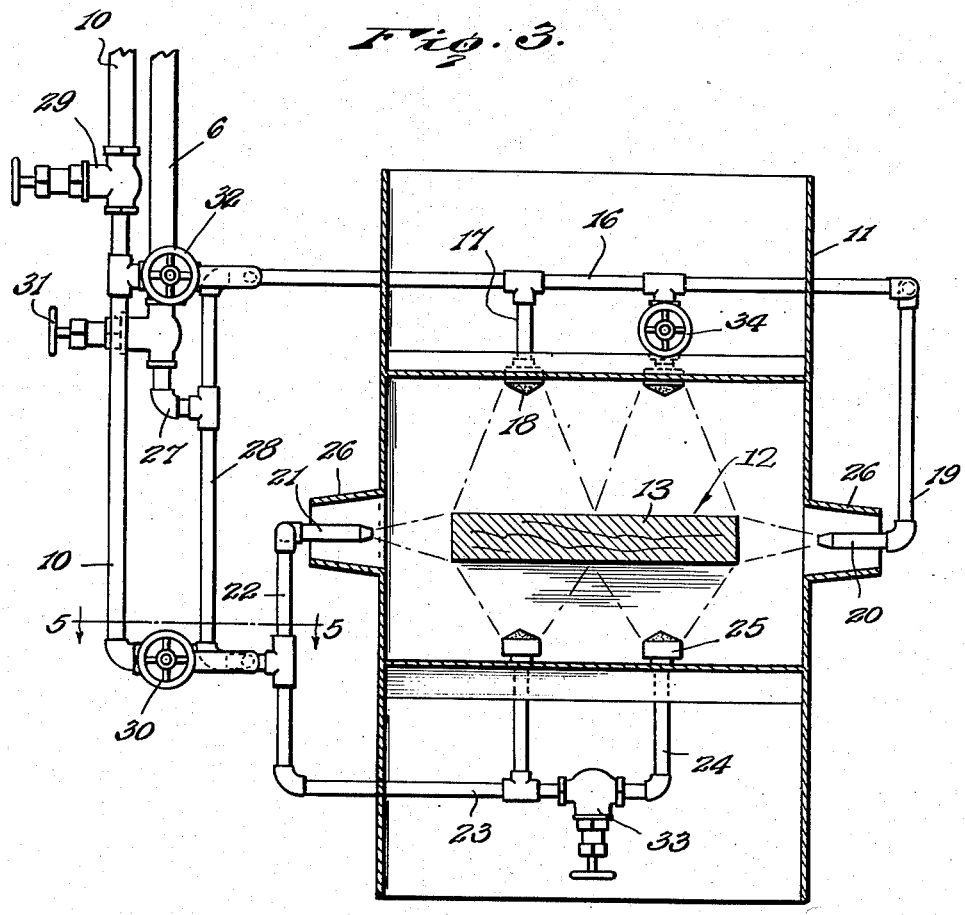
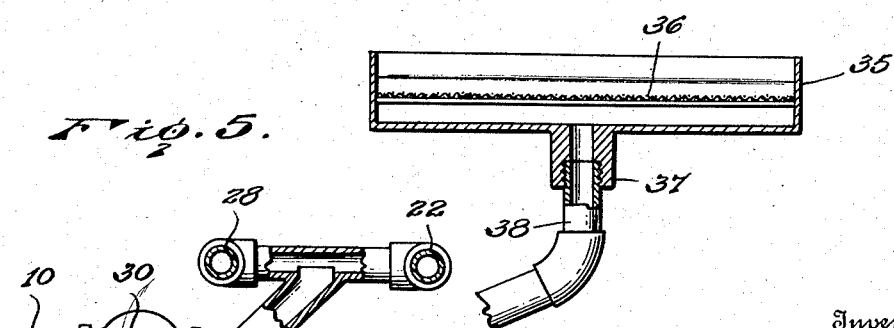
Inventor
M. B. Frank.
By Lacey & Lacey,
Attorneys July 2, 1940.   M. B. FRANK   2,206,179
APPARATUS FOR AUTOMATICALLY SPRAYING LUMBER WITH PRESERVATIVE FLUID
Filed Sept. 12, 1938   4 Sheets-Sheet 4
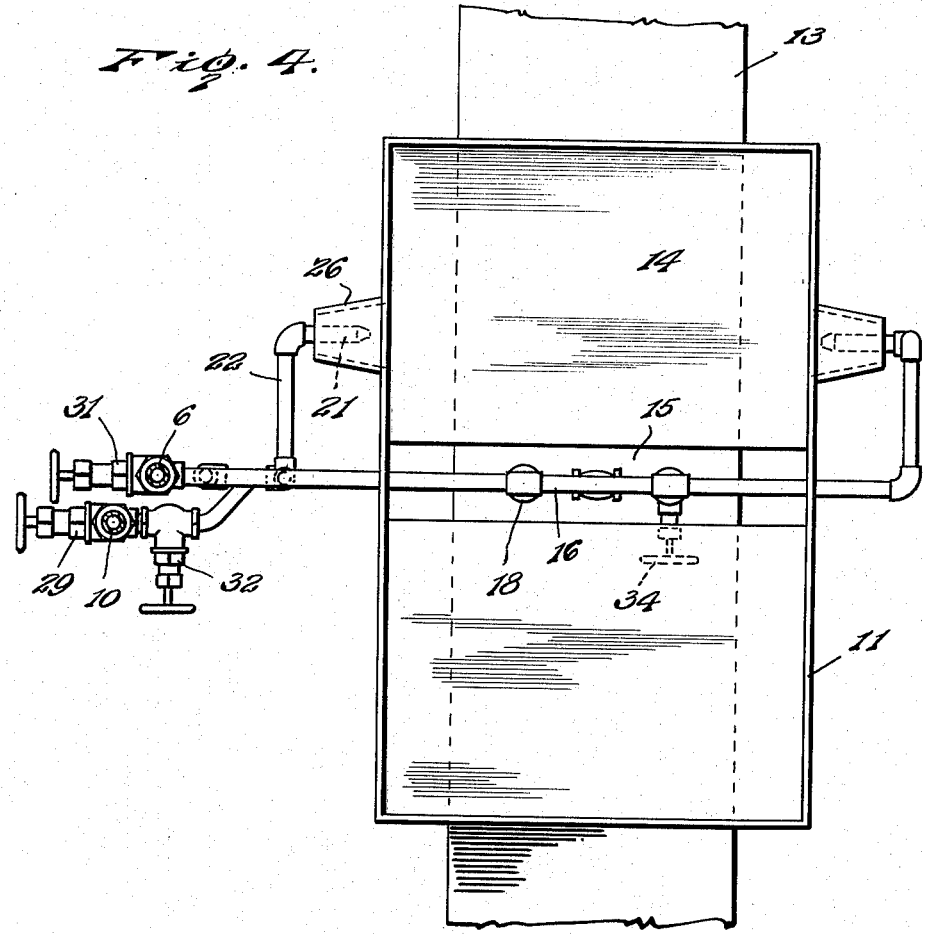

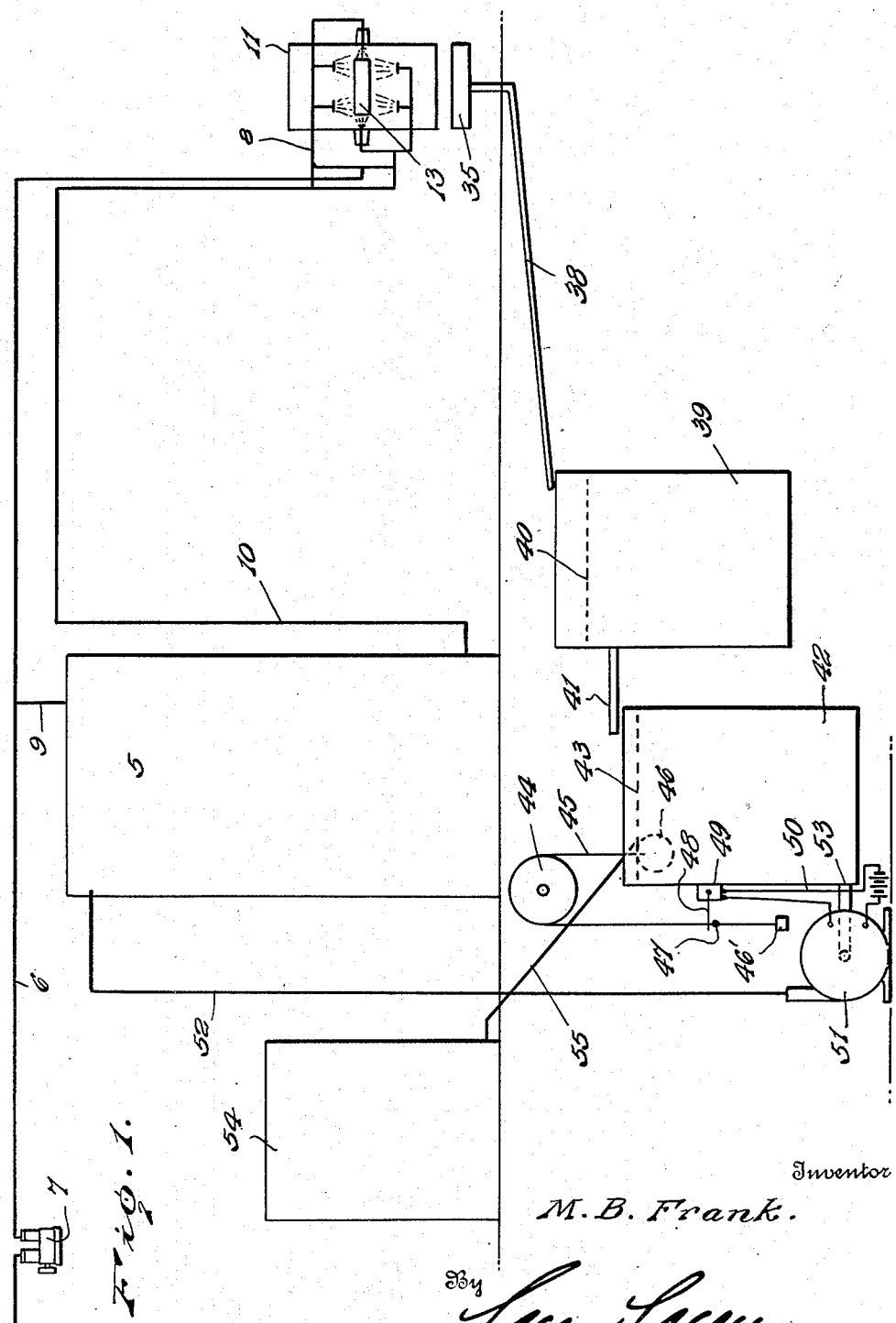

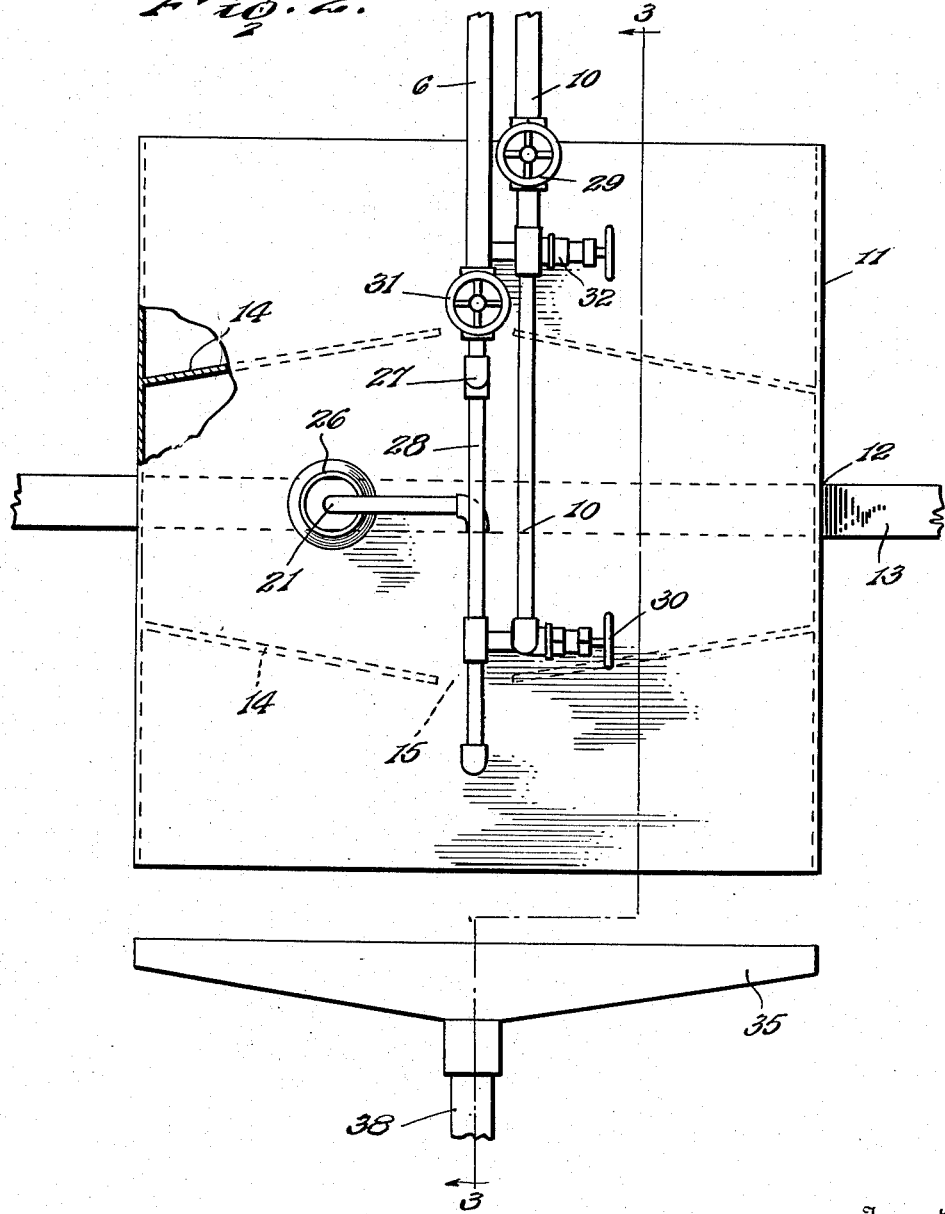

Patented July 2, 1940

2,206,179

UNITED STATES PATENT OFFICE 2,206,179

APPARATUS FOR AUTOMATICALLY SPRAYING LUMBER WITH PRESERVATIVE FLUID

Matthew B. Frank, St. Helens, Oreg.

Application September 12, 1938, Serial No. 229,606

6 Claims. (Cl. 91—44)

This invention relates to spraying apparatus and more particularly to a novel apparatus for automatically spraying the opposite sides and edges of lumber with a preservative mixture to prevent the formation of mold thereon and protect the lumber from destructive parasites and the deleterious action of the elements.

A further object of the invention is to provide an automatic spraying apparatus of simple and durable construction in which lumber either before or after being dressed is caused to travel through a receiving compartment and there subjected to the action of an aerated preservative spray, whereby the entire surface of the lumber will be impregnated with said preservative spray and thus keep the lumber in a good state of preservation for an indefinite period.

A further object is to provide a spraying apparatus having a novel form of housing or compartment for the reception of the lumber, said compartment being provided with spraying nozzles and having inclined guards disposed adjacent said nozzles for directing the surplus preservative mixture into a suitable tank adapted to receive the same.

A further object is to utilize air pressure for spraying the preservative fluid onto the lumber and further to provide a system of valves for controlling the amount of air admitted to the preservative fluid and the passage of said preservative fluid to the different spraying nozzles.

A still further object of the invention is generally to improve this class of devices so as to increase their utility, durability and efficiency.

In the accompaying drawings forming a part of this specification and in which similar numerals of reference indicate corresponding parts in all the figures of the drawings:

Figure 1 is a diagrammatic view of a lumber spraying apparatus embodying the present invention, Figure 2 is a side elevation of the lumber receiving housing or compartment.

Figure 3 is a vertical sectional view taken on the line 3—3 of Figure 2,

Figure 4 is a top plan view,

Figure 5 is a transverse sectional view taken on the line 5—5 of Figure 3, and

Figure 6 is a vertical sectional view, partly in elevation, illustrating a modified form of the invention.

The apparatus comprises a main supply tank 5 adapted to contain a suitable preservative mixture, such as a cresote solution or the like, which preservative mixture is adapted to be sprayed on the opposite sides and edges of the lumber in a manner hereinafter described. Arranged above the supply tank 5 is a pipe or conduit 6, one end of which is connected with an air compressor 7 of standard construction, while the other end of the conduit leads to a lumber receiving housing or compartment, indicated at 8. A short pipe 9 connects the air conduit 6 with the top of the supply tank 5 and through which air is admitted to said tank for the purpose of forcing the preservative mixture within the tank through a pipe or conduit 10 to the lumber within the compartment 8.

The lumber receiving compartment 8 comprises a casing or housing 11, preferably rectangular in shape, and having its upper and lower ends open, as shown, the side walls of the casing 11 being provided with transversely aligned openings 12 to permit the passage therethrough of any desired length of either dressed or undressed lumber, indicated at 13. Disposed within the casing 11 and secured to the adjacent side walls thereof are spaced inclined guard plates 14, the inner ends of which are spaced apart, as indicated at 15. Extending transversely through the casing or housing 11 above the upper guard plates 14 is a pipe 16 having spaced depending branch pipes 17 connected therewith and provided with terminal spraying heads 18 for applying preservative mixture to the upper surface of the lumber 13. The pipe 16 extends through the adjacent wall of the casing 11 and thence downwardly, as indicated at 19, and is provided with a terminal nozzle 20 for the purpose of spraying the adjacent side edge of the lumber. A similar spraying nozzle 21 is disposed on the other side of the casing 11 for the purpose of spraying the other edge of the lumber 13, said nozzle 21 being connected with a depending pipe 22 having a right angular extension 23 projecting within the casing beneath the adjacent lower guard plate 14 and provided with spaced upstanding pipes 24 carrying spraying heads 25 similar in construction to the spraying heads 18 and which heads 25 serve to spray the lower surface of the lumber 13. It will thus be seen that the arrangement of the nozzles 20 and 21 and the spraying heads 18 and 25 is such that the entire surface of the lumber 13 will be sprayed with a protective preservative film as the lumber 13 travels through the casing 11. The opposite sides of the casing 11 are preferably provided with tubular extensions 26 and the nozzles 20 and 21 are centered within said tubular extensions, as best shown in Figure 3 of the drawings. The air conductor 6 at a point opposite the casing 11 is provided with an elbow 27 which is connected with a branch air pipe 28 communicating with the pipes 16 and 23 respectively so that air from the conductor 6 will be mixed with the preservative mixture prior to its delivery to the spraying nozzles and heads of the lumber receiving compartment. The mixture conveying pipe 10 is provided with an upper globe valve 29 and a similar lower globe valve 30 for the purpose of controlling the flow of preservative fluid to the spraying heads. Similar valves 31 and 32 are connected in the air conductor 6 for the purpose of controlling the admission of air to the pipes 16 and 23 respectively. It will thus be seen that by adjusting the several valves the amount of air and preservative mixture leading to the spraying heads and nozzles may be controlled at will. A valve 33 is connected with the liquid pipe 23 so as to cut-off the flow of mixture to one of the lower spraying heads 25 when desired and a similar valve 34 is connected with one of the branch pipes 17 of the upper spraying heads 18 for a similar purpose.

Arranged beneath the lower end of the casing 11 and spaced therefrom is a drip pan 35 having a transverse screen 36 and provided with a depending nipple 37 in which is threaded one end of a discharge pipe 38 leading to a settling tank 39. It will here be noted that the lower guard plates 14 are inclined downwardly so that as the preservative fluid is sprayed over the surface of the lumber the surplus preservative fluid will be directed downwardly by the guard plates 14 and thence outwardly through the passage 15 into the drip pan where it will pass through the screen 36 and thence be delivered into the settling tank 39.

The settling tank 39 is provided near its upper end with a screen 40 and extending from said tank beneath the screen is a pipe 41 which discharges into a surplus tank 42 also provided with a screen 43. Arranged above and adjacent to the tank 42 is a pulley 44 over which is trained a belt or chain 45, one end of which is provided with a ball float 46 suspended within the tank 42 while the other end thereof terminates in a weight 46' for keeping the belt or chain 45 under tension. The belt or chain 45 is provided with a stop 47 adapted to engage a pivoted arm 48 carried by an electric switch 49. The switch 49 is connected in an electric circuit 50 with a pump 51 having a pipe 52 leading therefrom and connected with the upper end of the main supply tank 5 so that, when the surplus tank 42 becomes filled or substantially filled with liquid, the movement of the float 46 will actuate the switch 49 to close the circuit through the pump 51 and thus cause the pump to discharge the preservative liquid in the surplus tank through a branch pipe 53 and through the pipe 52 back into the main supply tank. The apparatus is also provided with a mixing tank 54 in which the various chemicals constituting the preservative fluid are initially mixed, the preservative mixture being then permitted to flow by gravity through an inclined pipe 55 leading to the surplus tank 42 above the screen 43 therein.

In operation, assuming the main supply tank is filled or partially filled with any suitable preservative fluid, air is admitted to the top of the tank through the branch pipe 9 and the preservative fluid forced under pressure through the supply pipe 10 to the spraying heads or nozzles. As the preservative fluid approaches the casing 11, air is admitted thereto and thoroughly commingles with the fluid so as to thoroughly aerate the same, and in which condition it will be sprayed directly on and over the upper and lower faces of the lumber as well as the opposite side edges thereof whereby to impregnate or partly impregnate the wood with the preservative mixture and prevent the formation of mold thereon and also protect the lumber from destructive parasites as well as the deleterious action of the elements. The lumber is caused to travel through the casing or housing at approximately four hundred and fifty to nine hundred and fifty feet per minute and as the lumber is sprayed, the surplus preservative liquid will be directed into the drip pan 35 and thence flow through the tube 38 into the tank 39 where any sawdust, slivers of wood or other foreign matter is allowed to settle before the fluid is delivered to the surplus tank 42. The liquid from the settling tank passes through the pipe 41 into the surplus tank 42, and as the level of the fluid in the tank 42 rises the float 46 will correspondingly rise and cause the stop 47 to close the switch 49 and actuate the pump 51, thereby conveying the liquid from the surplus tank back into the main tank, as will be readily understood.

In Figure 6 of the drawings, there is illustrated a modified form of the invention for spraying lumber by hand. In this form of the device, a liquid conducting pipe 56 and air pipe 57 extend through a tubular casing or housing 58 and are each provided with a controlling valve 59. The forward ends of the pipes 56 and 57 communicate with each other at a point adjacent a control valve 60 to which is connected a spraying nozzle 61 of any suitable construction. The valve 60 is provided with an upstanding stem 62 which is actuated by a pivoted hand lever 63 so that by depressing the lever 63 the discharge of liquid through the nozzle may be controlled at will. If desired, this form of the device may be used as an edger arbor oiler in which event oil will be fed through the pipe 56 instead of preservative fluid.

It will thus be seen that the device is automatic in action inasmuch as, after the several valves have once been set or adjusted to the proper position, the preservative fluid will be automatically sprayed over the entire surface of the lumber as said lumber is fed through the receiving casing or compartment.

From the foregoing description, it is thought that the construction and operation of the device will be readily understood by those skilled in the art and further description thereof is deemed unnecessary.

Having thus described the invention, what is claimed as new is:

1. An apparatus of the class described including a casing adapted to receive moving material, diverging guard plates disposed within the casing above and below the path of travel of the moving material and extending in the direction of the length of said material and having their inner ends separated, spraying devices disposed between the inner ends of said guard plates for spraying a preservative mixture on the upper and lower surfaces of the material as the material travels through the casing, spraying nozzles disposed at opposite sides of the casing for spraying the opposite edges of the material, means for feeding preservative mixture to the spraying devices and nozzles, and means for admitting air under pressure to the preservative mixture during the passage of said mixture to the spraying devices and nozzles, respectively.

2. An apparatus of the class described including a casing having oppositely disposed openings to permit the travel of a length of lumber therethrough, spraying devices disposed within the casing for spraying a preservative mixture on the upper and lower surfaces of the lumber, nozzles communicating with the interior of the casing at the opposite sides thereof for spraying said mixture on the opposite edges of the lumber, longitudinally inclined guard plates disposed within and secured to the casing above and below the path of travel of the lumber and having their inner ends separated to accommodate the spraying devices and to permit the escape of excess preservative mixture, a drip tank arranged below the casing for receiving said excess mixture, means for feeding a preservative mixture to said spraying devices and nozzles, respectively, and means for admitting air under pressure to said mixture during its passage to the nozzles and spraying devices.

3. An apparatus of the class described including a casing having an open bottom and provided with transversely alined openings to permit the travel of lumber therethrough, upper and lower spraying devices disposed within the casing for delivering a film of preservative mixture on the upper and lower surfaces of the lumber, side nozzles for delivering a film of preservative mixture on the opposite side edges of the lumber, means for supplying a preservative mixture to the spraying devices and nozzles, respectively, means for admitting air under pressure to the preservative mixture before delivery to the spraying devices and nozzles, a drip pan disposed beneath the open end of the casing, and inclined guard plates arranged within and secured to the casing above and below the path of travel of the lumber and extending longitudinally of said lumber, the inner ends of the guard plates being spaced apart to accommodate the spraying devices and to permit the surplus preservative mixture to drain through the open end of the casing into the drip pan.

4. An apparatus of the class described including a casing adapted to receive moving lumber, upper and lower sets of spraying devices disposed within the casing for spraying the upper and lower surfaces of the lumber with a preservative mixture, longitudinally inclined guard plates arranged within and secured to the casing above and below the path of travel of the moving lumber and having their inner ends separated to accommodate the upper and lower sets of spraying devices and to permit the escape of excess preservative mixture, a drip pan for receiving said excess mixture, valves for controlling the mixture to each set of spraying devices, side nozzles discharged into the casing for spraying the opposite side edges of the lumber, a pipe for feeding a preservative mixture to the spraying devices and nozzles, respectively, an air conductor connected with the mixture carrying pipe, and valves disposed in the mixture carrying pipe and air conductor for controlling the amount of aerated preservative mixture delivered to the spraying devices and nozzles, respectively.

5. An apparatus of the class described including a casing adapted to receive moving lumber, longitudinally inclined guard plates disposed within and secured to the casing above and below the path of travel of the lumber and having their diverging ends separated, spraying devices disposed between the separated ends of the guard plates, a main supply tank adapted to contain a preservative mixture, an air conductor connected with the supply tank and spraying devices, respectively, a feed pipe connected with the main supply tank and said air conductor, a drip pan disposed beneath the casing, a settling tank, a conductor forming a connection between the drip pan and settling tank, a surplus mixture receiving tank, a pipe for discharging material from the settling tank into the surplus mixture receiving tank, a pump, a switch, and a float operating in the surplus tank and adapted to actuate the switch to operate the pump when the fluid in the surplus tank reaches a predetermined height for conveying the mixture from the surplus tank into the main tank.

6. An apparatus of the class described including a casing adapted to receive moving lumber, upper and lower spraying devices disposed within the casing, side spraying nozzles discharging into said casing, a main supply tank adapted to receive a preservative mixture, a compressed air fluid conductor communicating with the upper portion of the supply tank and operatively connected with the spraying devices and nozzles, respectively, a mixture supply pipe communicating with the lower portion of the main tank and operatively connected with the compressed air pipe for feeding aerated preservative mixture to the spraying devices and nozzles, respectively, a drip pan disposed beneath the casing, longitudinally inclined guard plates arranged within and secured to the casing above and below the path of travel of the lumber and having their inner ends spaced apart to receive the upper and lower spraying devices and to permit excess preservative mixture to flow into the drip pan, a settling tank, a conductor leading from the drip pan to the settling tank, a tank adapted to receive surplus preservative mixture, a mixing tank communicating with the surplus tank, means for delivering mixture from the settling tank to the surplus tank, a pump operatively connected with the main tank and surplus tank, and means for operating the pump to convey the preservative mixture in the surplus tank into the main tank when the mixture in said surplus tank reaches a predetermined level.

MATTHEW B. FRANK.